US008325344B2

(12) United States Patent
Lee et al.

(10) Patent No.: US 8,325,344 B2
(45) Date of Patent: Dec. 4, 2012

(54) OPTICAL DENSITY DETERMINATION METHODS AND APPARATUS

(75) Inventors: Michael H. Lee, San Jose, CA (US); Daihua Zhang, Palo Alto, CA (US); Omer Gila, Cupertino, CA (US); William D. Holland, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 246 days.

(21) Appl. No.: 12/642,562

(22) Filed: Dec. 18, 2009

(65) Prior Publication Data

US 2011/0149284 A1 Jun. 23, 2011

(51) Int. Cl.
*G01N 21/55* (2006.01)

(52) U.S. Cl. ........ 356/445; 356/443; 356/446; 356/425; 356/406

(58) Field of Classification Search .................. 356/445, 356/446, 425, 612
See application file for complete search history.

(56) References Cited

U.S. PATENT DOCUMENTS

| | | | | |
|---|---|---|---|---|
| 6,707,553 | B1 * | 3/2004 | Imura | 356/402 |
| 7,391,518 | B1 * | 6/2008 | Schwarz et al. | 356/446 |
| 7,502,116 | B2 | 3/2009 | Gila et al. | |
| 2008/0055666 | A1 | 3/2008 | Gila et al. | |

OTHER PUBLICATIONS

Hewlett-Packard Development Company, "Calibrated Reflection Densitometer", PCT/US2009/062882, Filed Oct. 30, 2009.

Hewlett-Packard Development Company, "Reflection Densitometer", PCT/US2010/020325, Filed Jan. 7, 2010.

Aharon et al., "Estimation of Spectral Reflectance from Densitometric Measurements Using Printing Model Prior", CIC 17, Nov. 2009, pp. 301-305.

* cited by examiner

*Primary Examiner* — Tarifur Chowdhury
*Assistant Examiner* — Isiaka Akanbi

(57) ABSTRACT

At least some aspects of the disclosure are directed towards densitometers and methods of determining optical density of printed images upon media. According to one example, an optical density determination apparatus includes a first light source configured to emit a first light beam in a first direction towards a substrate; a second light source configured to emit a second light beam in a second direction towards the substrate, the second direction being different than the first direction; a first sensor configured to sense light of the first light beam reflected from the substrate; a second sensor configured to sense light of the second light beam reflected from the substrate; and wherein the first and second sensors are configured to provide signals indicative of the light sensed by the first and second sensors and which are useable to determine optical density of the substrate.

20 Claims, 7 Drawing Sheets

OPTICAL DENSITY DETERMINATION METHODS AND APPARATUS

BACKGROUND

Densitometers are utilized in printing applications to provide information regarding optical density of printed images which may be used to maintain color consistency of printed output of printers and digital printing presses. The governing International Standards Organization (ISO) T-status standard for densitometer measurements specifies the light source of the densitometer being incident upon the substrate at 45 degrees with respect to normal to reduce specular Fresnel reflection from entering the sensor of the densitometer. However, densitometers configured according to this standard have increased sensitivity to variations in the paper height, which may be difficult to continuously control in many printing applications. Furthermore, some densitometers which comply with the ISO T-status standard are relatively costly.

At least some aspects of the disclosure are directed towards improved densitometer arrangements and methods of determining optical density of printed media.

DESCRIPTION OF DRAWINGS

FIG. 3 is an illustrative representation of operations of a densitometer according to one embodiment.

DETAILED DESCRIPTION

At least some aspects of the disclosure are directed towards densitometers and methods of determining optical density of printed images upon media. The information of optical density may be used to provide increased color consistency in printed output of hard imaging devices. As described below, some aspects of the disclosure provide densitometers which provide optical density measurements which are similar to densitometers which comply with the ISO T-status standard at reduced cost and reduced sensitivity to paper height variances during printing operations. According to some embodiments, the densitometers may be tilted with respect to the substrate being imaged upon to provide increased accuracy with respect to determination of the optical density. According to additional embodiments, a plurality of densitometers may be used to provide increased accuracy compared with use of a single densitometer. Additional aspects are described below according to additional embodiments.

Figure 1:
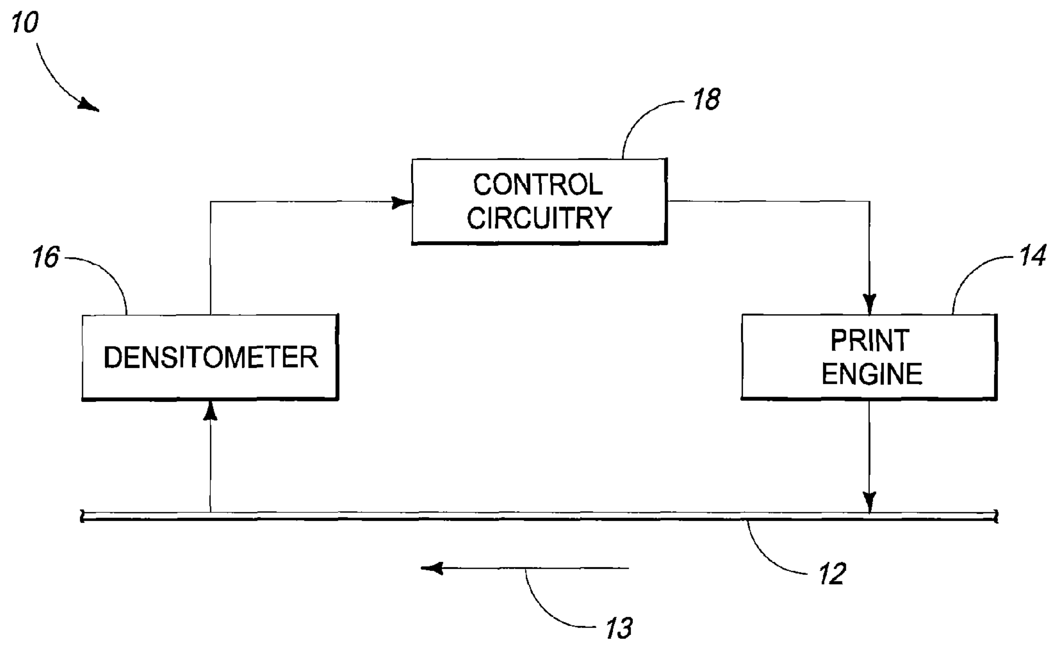
FIG. 1 is a functional block diagram of a hard imaging device according to one embodiment.

Referring to FIG. 1, an example embodiment of a hard imaging device 10 is shown. The hard imaging device 10 includes a print engine 14, a densitometer 16 and control circuitry 18 in the illustrated embodiment. Other embodiments are possible including more, less and/or alternative components.

Print engine 14 is configured to provide a marking agent (e.g., dry toner or liquid inks) upon a substrate 12 (e.g., paper or other media) traveling along a media path 13. In one embodiment, print engine 14 is configured to implement offset printing of one or more colors of marking agents upon substrate 12.

Densitometer 16 is configured to monitor the optical density of marking agents upon the substrate 12 and to provide information regarding the optical density of marking agents upon the substrate 12 to control circuitry 18. In some embodiments, a plurality of densitometers 16 may be provided as described below. In one embodiment, the one or more densitometers 16 may individually output a light-to-voltage (LTV) signal indicative of optical density of images upon substrate 12 to control circuitry 18.

Control circuitry 18 is configured to control imaging operations of hard imaging device 10. Control circuitry 18 may implement calibration operations of hard imaging device 10 in some embodiments. More specifically, the printing process may drift during imaging operations which may adversely affect print quality, such as color consistency, of printed output. In one embodiment, control circuitry 18 uses the signals regarding optical density of formed images upon substrate 12 provided by one or more densitometers 16 to control the optical density of subsequently formed images upon substrate 12 by print engine 14 to provide increased color consistency of the printed output.

In one more specific embodiment, control circuitry 18 may determine amounts of marking agents needed to be provided to substrate 12 during the formation of images using the output of densitometers 16. In one example, a calibration procedure may be executed where the print engine 14 images a plurality of different colors of test patches and the optical densities of the patches are determined using one or more densitometers 16 and the control circuitry 18 may monitor the determined optical density information to determine whether the hard imaging device 10 is within specification or whether adjustments need to be made to achieve desired color consistency. In one embodiment, the one or more densitometers 16 and the control circuitry 18 may be referred to as an optical density determination apparatus of the hard imaging device 10.

Control circuitry 18 may comprise circuitry configured to implement desired programming provided by appropriate media in at least one embodiment. For example, the control circuitry 18 may be implemented as one or more of a processor and/or other structure configured to execute executable instructions including, for example, software and/or firmware instructions, and/or hardware circuitry. Exemplary embodiments of control circuitry 18 include hardware logic, PGA, FPGA, ASIC, state machines, and/or other structures alone or in combination with a processor. These examples of control circuitry 18 are for illustration and other configurations are possible. In one embodiment, control circuitry 18 is configured to receive signals outputted from one or more densitometers 16 and to process the signals to determine optical densities of images upon substrate 12.

Figure 2:
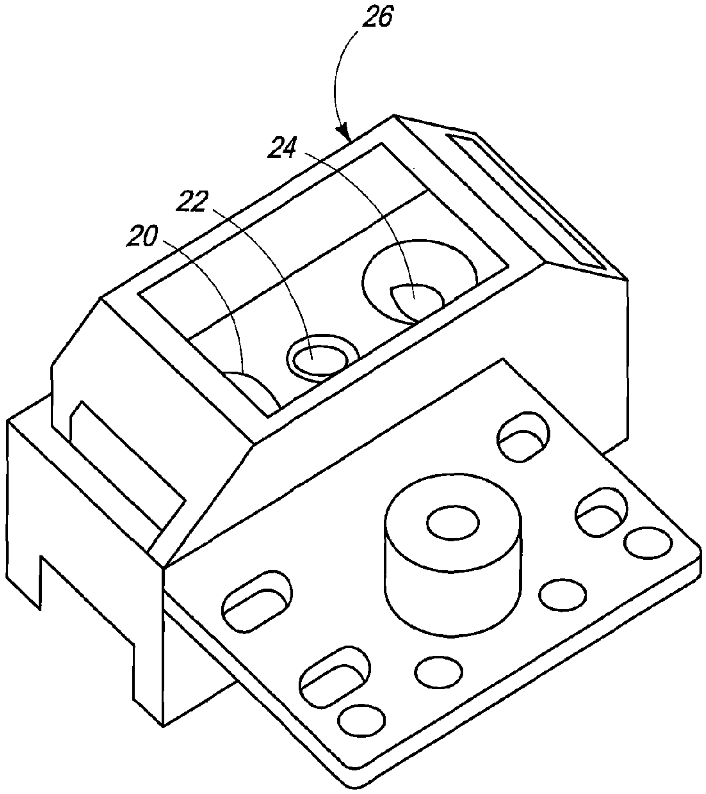
FIG. 2 is an isometric view of a densitometer according to one embodiment.
Figure 2:
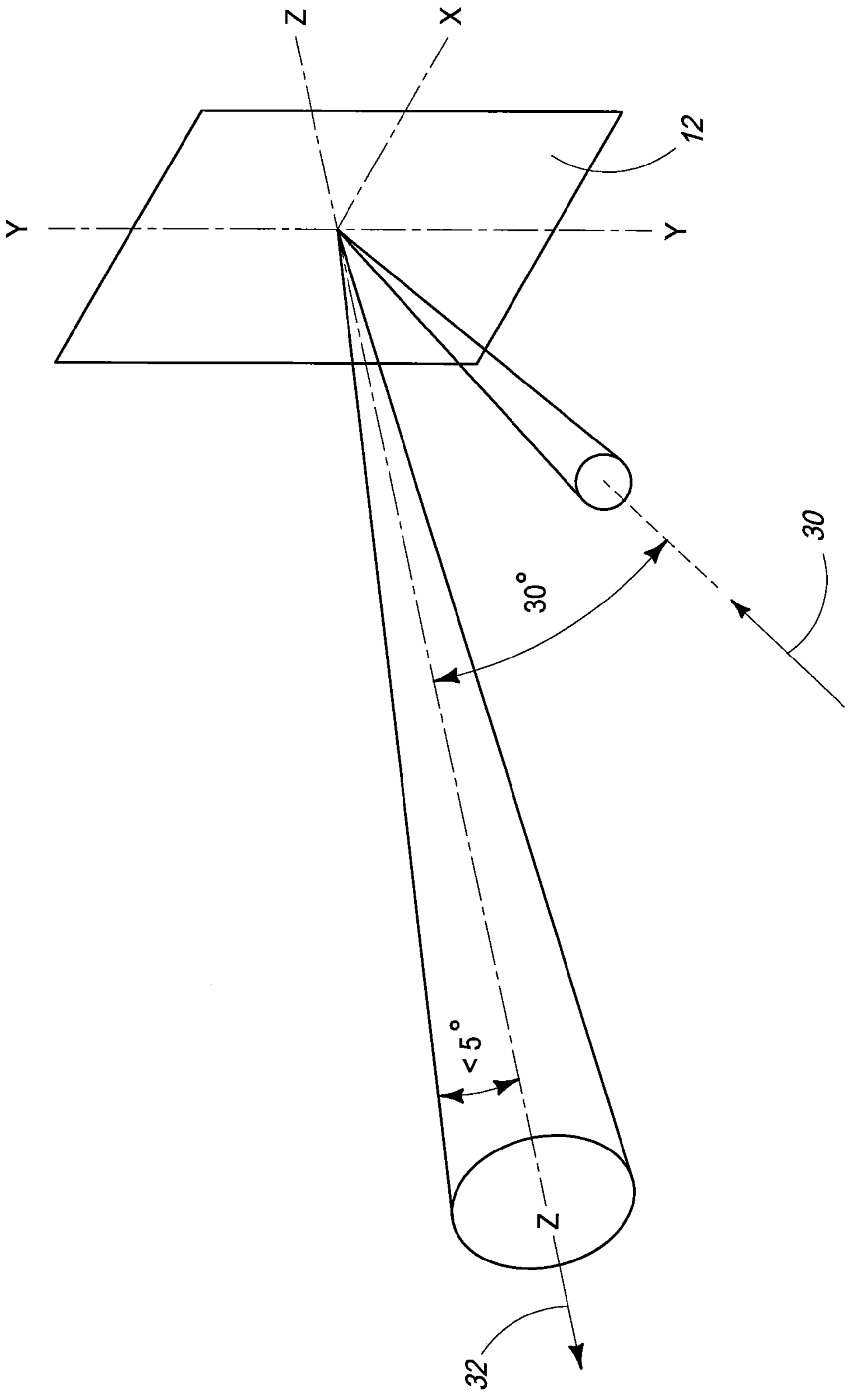

Referring to FIG. 2, an example of one configuration of a densitometer 16 is shown. The illustrated densitometer 16 is a Tetris Model No. K783P available from Vishay Intertechnology, Inc. The densitometer 16 includes a light source 20, a diffuse sensor 22 and a specular sensor 24 in the illustrated example embodiment.

The light source 20 is configured to emit different colors of light for monitoring different colors of marking agent in the illustrated embodiment. For example, the light source 20 may include LEDs configured to emit red, green, and blue light beams in one embodiment. The different light beams may be emitted at different moments in time. The emitted light passes through a face plane 26 (defined by the bottom of the densitometer 16) and is directed towards substrate 12. Some of the reflected light from the substrate 12 also passes through the face plane 26 and is received by the densitometer 16. Additional details regarding the above-described densitometer 16 are provided in a co-pending US patent application titled "Calibration Reflection Densitometer," having serial number PCT/US2009/062882, filed Oct. 30, 2009, naming William D. Holland as inventor, and assigned to the assignee hereof.

Diffuse sensor 22 is configured to monitor light reflected from the substrate 12 and may output light-to-voltage (LTV) signals to control circuitry 18 indicative of the optical densities of marking agents of images formed upon the substrate 12.

Specular sensor 24 receives light reflected from substrate 12 depending upon substrate or image smoothness as opposed to image density. Relatively smooth substrates 12 produce relatively large specular sensor signals and matte substrates 12 produce relatively small specular signals. Specular sensor 24 may be omitted in some embodiments. The sensor 24 may output light-to-voltage (LTV) signals in response to the received light and indicative of the received light in one example.

Referring to FIG. 3, additional details of an optical geometry of the above-described densitometer 16 are illustrated. The light source 20 of the densitometer 16 is configured to emit a light beam 30 towards the substrate 12. In the illustrated example with the face plane 26 of the densitometer substantially parallel to the substrate 12, the light 30 is emitted at an angle of approximately 30 degrees with respect to a vector which is substantially normal with respect to the substrate 12, and which is also referred to as the substrate normal vector herein. Some light is reflected by the substrate 12 and reflected light 32 is received by the diffuse sensor 22. In the described embodiment, the diffuse sensor 22 is configured to receive reflected light along a vector perpendicular to the face plane, and which is also referred to as the diffuse vector herein. A plane including a vector of the emitted light and the diffuse vector is referred to as the optical plane herein. In typical implementations, the diffuse vector is parallel to the substrate normal vector. However, as described below, the densitometer may be tilted with respect to the substrate 12 in some embodiments. The output of the diffuse sensor 22 is processed by the control circuitry 18 to provide information indicative of optical density.

The above-described optical geometry of densitometer 16 provides directional lighting which tends to emphasize surface texture. The directional lighting is at 30 degrees in one embodiment as opposed to 45 degrees of the T-status standard and unfortunately emphasizes gloss and which may result in reduced accuracy. Although specular reflection is mostly directed at an equal angle from the substrate normal vector (compared with the angle of incidence) and hence is received by specular detector 24 in the illustrated example in FIG. 3, some of the light is scattered toward the density sensor 22. The fraction depends on the substrate surface texture and falls off as the angle veers away from the usual specular beam. Hence the fraction entering the density sensor 22 depends on the incident angle and is different for 30 degrees compared to the T-status standard.

According to some embodiments of the disclosure described below, the face plane 26 of densitometer 16 may be tilted along one or more axes (and accordingly tilt the diffuse vector away from the substrate normal vector) which improves the accuracy of the output of densitometer 16 with respect to LTV signals which may be used to calculate optical density. Furthermore, a plurality of densitometers 16 depicted in FIG. 2 may be used to monitor substrate 12 and the output of the plural densitometers 16 may be combined to provide increased accuracy of optical density compared with arrangements which utilize a single densitometer 16 as described further below.

Figure 4A:
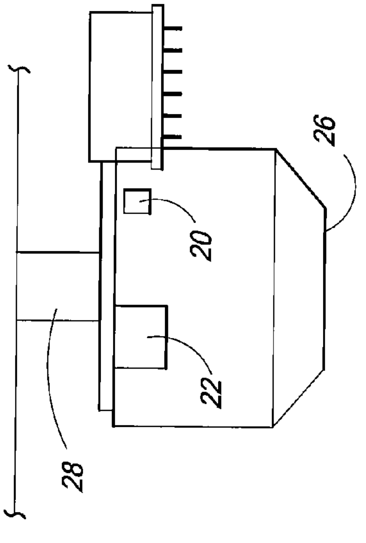
FIGS. 4A-4C are views of a densitometer according to different embodiments.
Figure 4B:
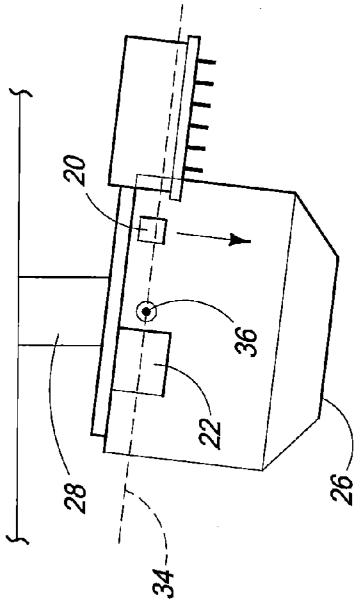
Figure 4C:
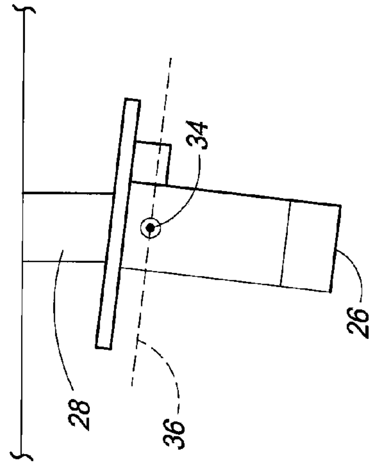

Referring to FIGS. 4A-4C, some aspects of tilting densitometer 16 are described according to example embodiments. The specular sensor 24 shown in FIG. 2 is omitted in the illustrated examples. In some disclosed embodiments, the densitometer 16 may be tilted to reduce the amount of undesired specular reflections from entering the sensor 22. As shown, the illustrated densitometer 16 may be coupled with a support 28 which is configured to provide the face plane 26 of densitometer 16 in different orientations with respect to the substrate 12.

FIG. 4A depicts a first example arrangement where the densitometer 16 is arranged in a conventional orientation where the face plane 26 of the densitometer 16 is substantially parallel to the substrate 12. The light is emitted at an angle of approximately 30 degrees with respect to the substrate normal vector and light is sensed along the diffuse normal vector in the arrangement of FIG. 4A. The specular reflection is approximately 30 degrees relative to the sensor 22 in this standard arrangement.

FIGS. 4B and 4C show the densitometer 16 tilted about respective axes 36, 34 (i.e., densitometer 16 in FIG. 4B is tilted about axis 36 and densitometer 16 in FIG. 4C is tilted about axis 34). Other axes may be used in other embodiments. As mentioned above, the ISO T-status standard specifies emission of light at 45 degrees. The described densitometer 16 of FIG. 4A emitting light at 30 degrees relative to the substrate normal vector is tilted about axis 36 in the embodiment of FIG. 4B to approximate the standard. More specifically, in the illustrated embodiment of FIG. 4B, the face plane 26 of the densitometer 16 is tilted at approximately 7.5 degrees from being parallel to substrate 12 so the light is emitted at an angle of approximately 37.5 degrees with respect to the substrate normal vector compared with 30 degrees with respect to the substrate normal vector of the arrangement of FIG. 4A. In this configuration, the specular reflection vector is at 37.5 degrees from the substrate normal vector and the difference from the diffuse vector is the sum (i.e., 45 degrees) making the angular difference between the diffuse vector and the specular reflection vector substantially the same as an ISO T-status densitometer. This tilting of the densitometer 16 reduced optical density (OD) error of the densitometer 16 compared with measurements of a ISO T-status densitometer as described further below.

Referring to FIG. 4C, the densitometer 16 may also be tilted about another axis by support 28 to improve the accuracy of the densitometer 16. In the embodiment of FIG. 4C, the face plane 26 of the densitometer 16 is tilted about a longitudinal axis 34 which passes through the light source 22 and the sensor 24. While the face plane 26 of the example arrangement of FIG. 4C is tilted about the longitudinal axis 34, the face plane 26 may be tilted about other axes in other embodiments. In one embodiment, face plane 26 may be tilted along plural axes, such as the substantially orthogonal axes 34, 36.

This tilting of the densitometer 16 along one or more axes 34, 36 reduced optical density (OD) error compared with measurements of a ISO T-status densitometer. The tilting and resulting reduction in deviation from the T-status densitometer indicate that specular reflection is a major contribution to deviation of the described densitometer 16 of FIG. 2 compared with an ISO T-status standard densitometer.

The distance or height between the densitometer 16 and the substrate 12 travelling along the media path 13 may vary during imaging operations of some hard imaging devices 10. Densitometer arrangements having reduced angular separation between the source and the sensor have reduced sensitivity to height compared with arrangements with larger separation between the source and sensor. The example densitometer 16 described herein having a separation of approximately 30 degrees between the source 20 and sensor 22 is calculated to be approximately 1.73 times less sensitive to height variations compared with a T-status compliant densitometer arrangement having approximately 45 degrees of angular separation. A densitometer 16 which was tilted as described with respect to FIGS. 4B and 4C was tested and the height sensitivity was not significantly affected for red, green and blue source light compared with arrangements of densitometer 16 which were not tilted. The signal strength of the densitometer 16 may be reduced in the example tilted arrangements discussed herein, and accordingly, a light source 20 of increased intensity may be used in some embodiments where the densitometer 16 is tilted. Variance of output of densitometer 16 arranged as described in FIG. 4B with respect to a T-status densitometer was reduced from 0.15 OD to 0.08 OD.

The ISO T-status standard calls for illumination from multiple uniformly placed sources around the spot to be sensed with all beams at the 45 degree incident angle. As such, the sensed signal averages the readings from the multiple sources. Some arrangements of densitometer 16 using a light source 20 positioned at a singular azimuth location with respect to the sensor 22 may be subject to anisotropy of the printing process and/or substrate 12 (e.g., substrate 12 comprising matte paper where angular optical density dependence may be significant, such as 0.2 OD). Accordingly, in some embodiments, it may be desired to use a plurality of densitometers 16 which are provided at different azimuth orientations with respect to the print or process direction of substrate 12 corresponding to the direction of substrate 12 travelling along the media path 13. The position of each densitometer 16 is arranged to sense substantially the same swath with the output read by the first densitometer from a spot on the substrate 12 delayed at the second densitometer by the transit time of the substrate 12 from beneath the first densitometer to the second densitometer. The outputs of the plural densitometers 16 may be provided to control circuitry 18 and both used to determine the optical density in one embodiment. In some embodiments, the longitudinal axes (e.g., axis 34 of FIG. 4B) of the densitometers 16 are arranged at substantially orthogonal orientations with respect to one another. The densitometers 16 may be arranged at different azimuth orientations with respect to one another in other embodiments.

Figure 5:
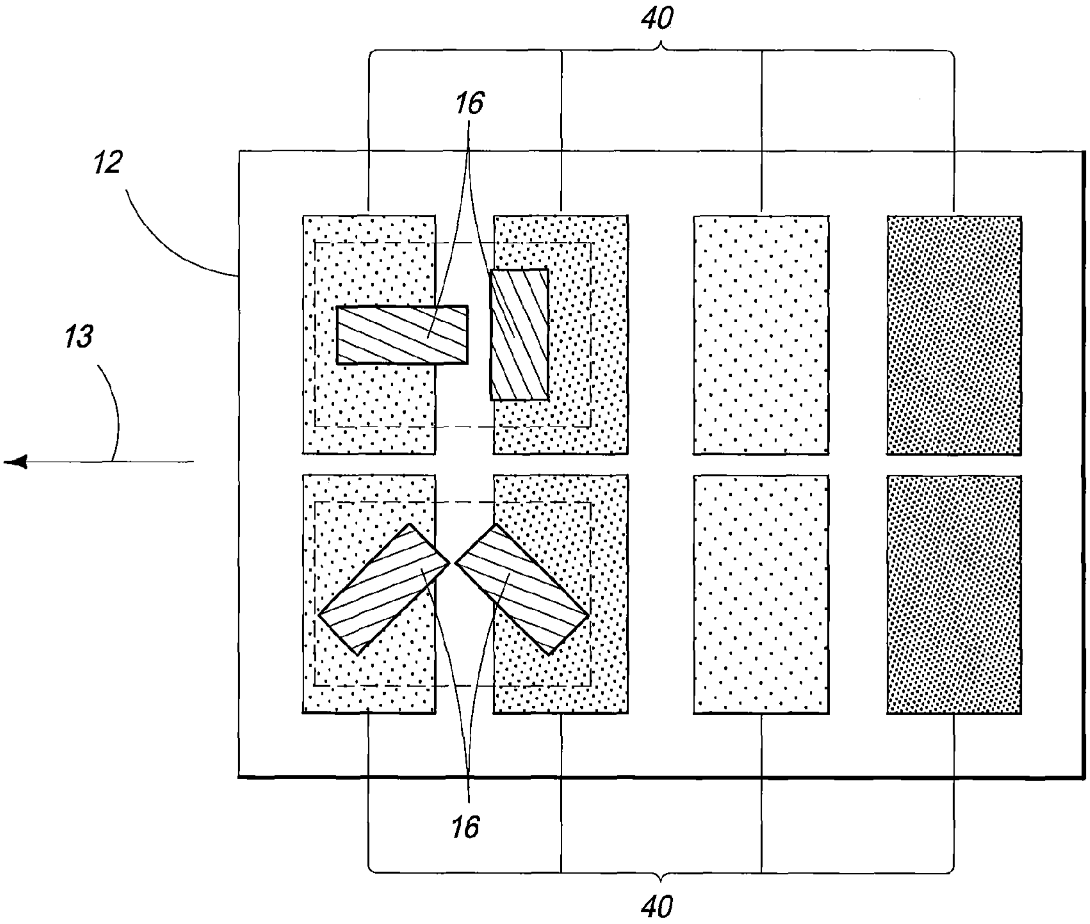
FIG. 5 is a plan view of plural densitometers and a sheet of media according to one embodiment.

Referring to FIG. 5, two possible example embodiments for determining optical density of a marking agent upon substrate 12 (each using a plurality of densitometers 16) are shown. In typical implementations, only one of the example embodiments for determining optical density is utilized.

In each of the illustrated example configurations including the top embodiment and the bottom embodiment, two densitometers 16 are arranged at different angles with respect to the process direction. More specifically, the illustrated substrate 12 includes two rows of different colored patches 40 of a color calibration sheet which are monitored by the respective configurations of densitometers 16.

The top arrangement includes two densitometers 16 configured to monitor the top row of patches 40 and the bottom arrangement includes two densitometers 16 configured to monitor the bottom row of patches 40. In the top example configuration, the densitometer 16 on the left is arranged with its longitudinal axis 34 corresponding to the process direction while the densitometer 16 on the right is arranged with its longitudinal axis 34 orthogonal to the process direction. In the bottom example configuration, the densitometers 16 are arranged with their respective longitudinal axes 16 at angles of approximately 45 degrees with respect to the process direction. Additional embodiments are possible where the longitudinal axes of the densitometers 16 may be arranged at different angles with respect to the process direction and/or additional numbers of densitometers 16 are utilized at different azimuth angular orientations. The densitometers 16 are individually configured to emit a light beam towards the substrate 12 along its respective longitudinal axis 34 in the described example. Accordingly, the first and second densitometers 16 of the example arrangements of FIG. 5 emit light beams in directions which are substantially orthogonal to one another in one embodiment.

In one embodiment, the control circuitry 18 receives the output signals (e.g., light-to-voltage (LTV) signals) of the plural densitometers 16 (e.g., of the top arrangement or bottom arrangement of FIG. 5) which are indicative of the light sensed by the respective densitometers 16. The control circuitry 18 processes the plural signals to provide information regarding the sensed optical density, and which may be used for example for color calibration of the hard imaging device 10. In one specific example, the control circuitry 18 averages the signals on the same spot on the media from the densitometers 16 to determine the optical density. The utilization of a plurality of densitometers 16 reduces variations in OD measurements resulting from different types of media, for example, highly anisotropic matte media compared with use of a single densitometer 16. Use of plural densitometers 16 as described in one embodiment improves OD accuracy on matte substrates by approximately 4.5 times compared with use of a single densitometer 16. The use of measurements from plural densitometers 16 suppresses angular variation of measurements of substrate 12, especially matte media, compared with measurements from a single densitometer 16 and which results in the reductions of OD errors. In some embodiments, the use of plural densitometers 16 as shown in FIG. 5 may also be combined with the example tilting embodiments of FIGS. 4B and/or 4C to further reduce OD errors.

Figure 6A:
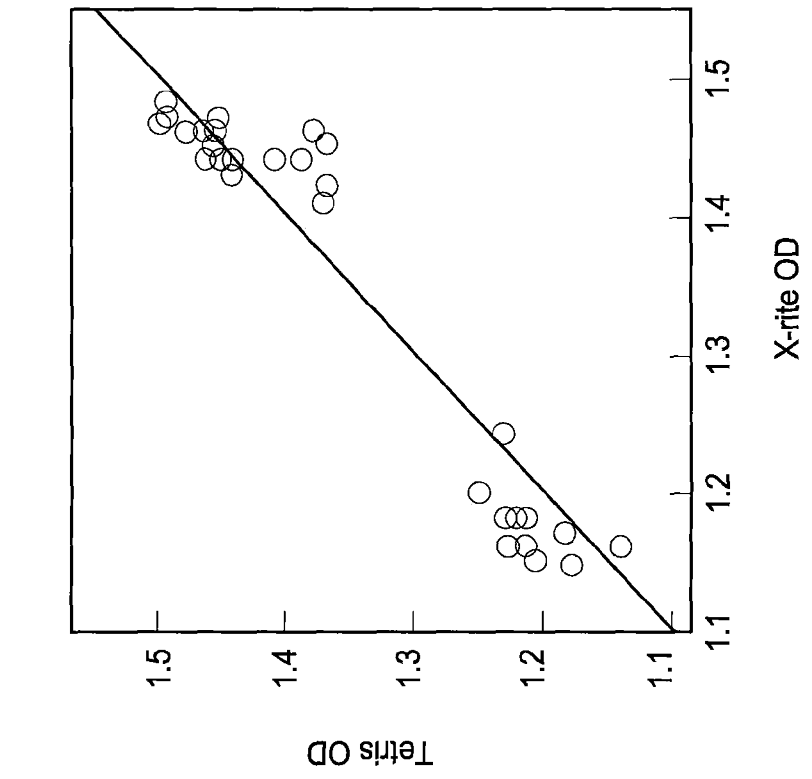
FIGS. 6A-6D are graphical representations of measurements of outputs of different embodiments of densitometers.

Referring to FIGS. 6A-6D, optical density results of different configurations of densitometers 16 as described herein (y axis) and compared with optical density results of a 500 series T-status standard densitometer available from X-Rite, Incorporated (x axis) are illustrated. FIG. 6A illustrates OD measurements of a single densitometer 16 which is not tilted with respect to the T-status densitometer for different types of substrate 12. There is an error range of approximately 0.15 OD in FIG. 6A.

Figure 6B:
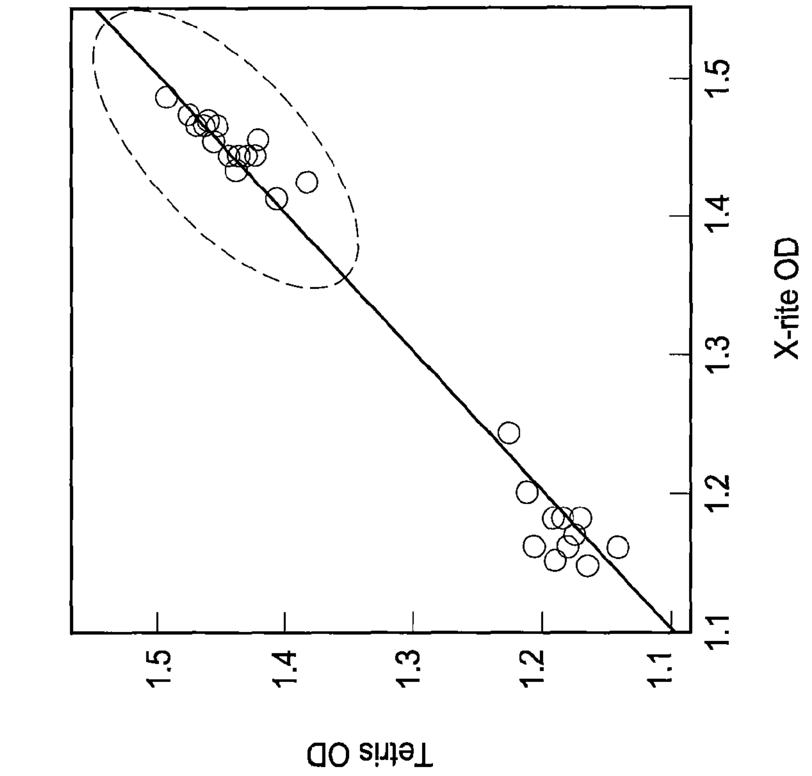

In FIG. 6B, one densitometer 16 was tilted on two axes as described with respect to FIGS. 4B and 4C which resulted in reduced OD errors of approximately 0.08. The accuracy improvement came primarily from gloss substrates with typical OD ranging from 1.4 to 1.6 as highlighted by the dashed oval.

Figure 6C:
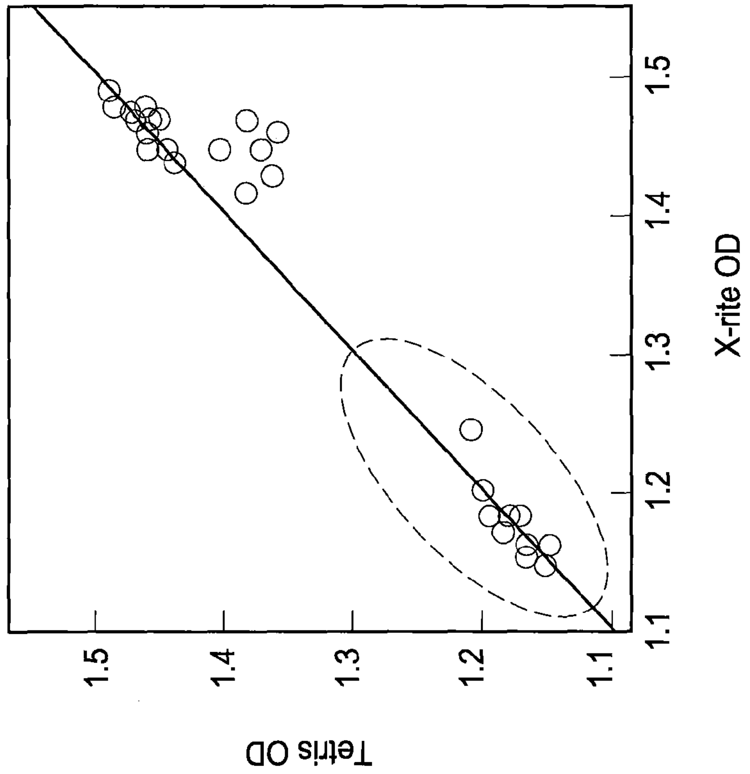

In FIG. 6C, an example error range of approximately 0.11 OD was measured for two un-tilted densitometers 16 arranged orthogonal to one another as described with respect to FIG. 5. Averaging the output from two densitometers substantially reduced the OD error on matte substrates as the dashed oval highlighted.

Figure 6D:
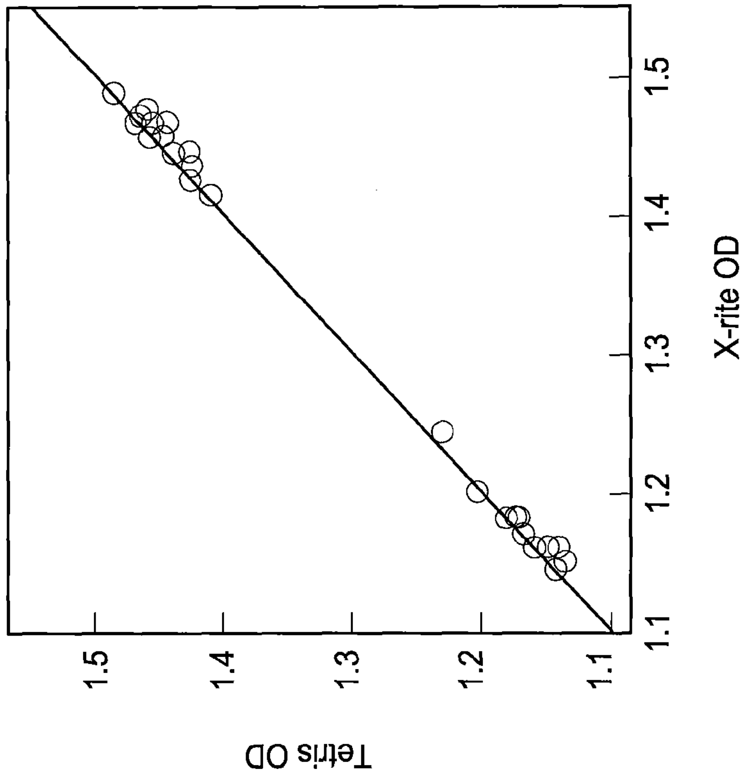

In FIG. 6D, an example error range of approximately 0.025 OD was measured for two densitometers 16 tilted per FIGS. 4B and 4C and arranged orthogonal to one another as described with respect to FIG. 5. In one embodiment, two calibration curves appropriate for matte and gloss substrates were used to convert the respective LTV signals to OD measurements which resulted in a six times improvement compared with a single densitometer which was not tilted.

Figure 7:
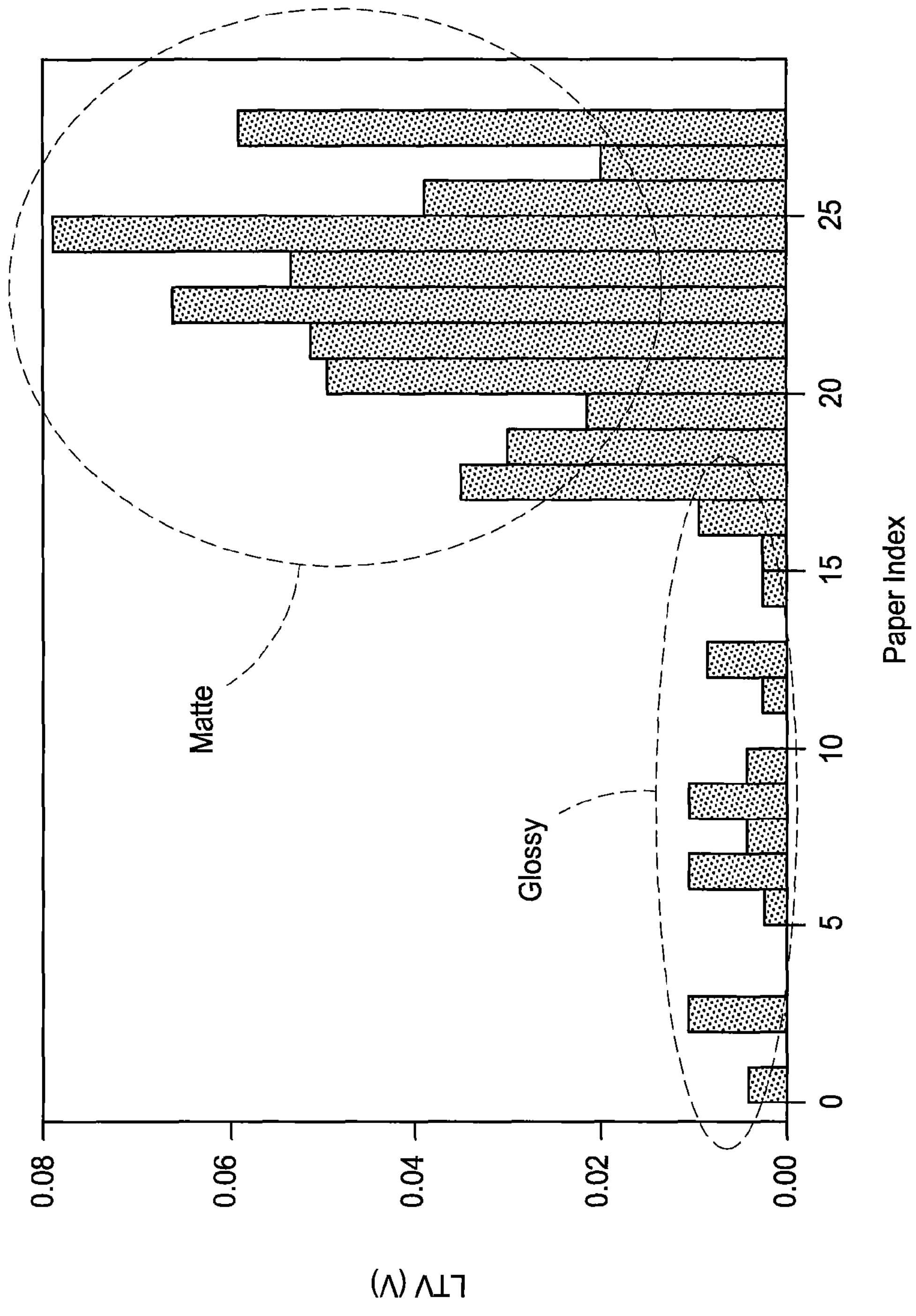
FIG. 7 is a graphical representation of output of a densitometer for different types of media according to one embodiment.

Referring to FIG. 7, a graph of the difference of output signals measured from two orthogonally-arranged densitometers 16 is shown for glossy and matte substrates 12. The plural densitometers 16 process signals from two different azimuth orientations. As shown in FIG. 7, the angular OD dependence of matte and glossy papers may be distinct and the control circuitry 18 may distinguish between different types of media by evaluating the difference between the outputs of the plural densitometers 16 in one embodiment.

As described herein, some embodiments of the disclosure provide arrangements which increase the accuracy of relatively inexpensive densitometers (e.g., FIG. 2) with respect to measuring optical density of printed media. As discussed herein, some arrangements provide performance similar to T-status standard compliant densitometers with reduced cost.

Furthermore, some examples of the densitometers used in some described embodiments have reduced angular separation of the source and sensor compared with T-status densitometers (e.g., 30 degrees versus 45 degrees). The reduction of the angular separation of the source and sensor of the densitometer may reduce the sensitivity of the densitometer to variations in the height of the media with respect to the densitometer. For example, providing the source and sensor at an angle of separation of approximately 20 degrees reduces sensitivity by 2.7 times compared with 45 degrees of separation of the T-status compliant densitometers.

The protection sought is not to be limited to the disclosed embodiments, which are given by way of example only, but instead is to be limited only by the scope of the appended claims.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

The invention claimed is:

1. An optical density determination apparatus comprising:

a first light source to emit a first light beam in a first direction towards a substrate;

a second light source to emit a second light beam in a second direction towards the substrate, the second direction being different than the first direction;

a first sensor to sense diffused light of the first light beam reflected from an illuminated spot on the substrate at a first distance from a center of the illuminated spot on the substrate, the first light source to emit the first light beam at a first angle relative to a normal vector from the center of the illuminated spot on the substrate, the first sensor tilted relative to at least one axis at a second angle relative to the normal vector from the center of the illuminated spot on the substrate to reduce a specular reflection of the first light beam sensed by the first sensor from the substrate relative to the first sensor at the normal vector from the center of the illuminated spot on the substrate and at the first distance from the center of the illuminated spot on the substrate;

a second sensor to sense diffused light of the second light beam reflected from the illuminated spot on the substrate at a second distance from the center of the illuminated spot on the surface at a third angle relative to the normal vector from the center of the illuminated spot on the substrate to reduce a specular reflection of the second light beam sensed by the second sensor at the third angle relative to the second sensor located at the normal vector from the center of the illuminated spot on the substrate and at the second distance from the center of the illuminated spot on the substrate; and the first and second sensors to provide signals indicative of the light sensed by the first and second sensors, the signals useable to determine an optical density associated with the substrate.

2. The apparatus of claim 1 wherein the first light source and the first sensor are part of a first densitometer and the second light source and the second sensor are part of a second densitometer.

3. The apparatus of claim 2 wherein a face plane of the first densitometer is tilted relative to a first axis, a second face plane of the second densitometer is tilted relative to a second axis substantially orthogonal to the first axis.

4. The apparatus of claim 3 wherein the face plane of the first densitometer and the second face plane of the second densitometer are to be individually tilted along corresponding ones of the first and second axes which are substantially parallel to a line passing through a respective one of the first and second light sources and a respective one of the first and second sensors.

5. The apparatus of claim 3 wherein the face plane of the first densitometer and the second face plane of the second densitometer are to be individually tilted along corresponding ones of the first and second axes which are substantially orthogonal to a line passing through a respective one of the first and second light sources and a respective one of the first and second sensors.

6. The apparatus of claim 3 wherein the first densitometer is tilted with respect to the substrate relative to a second axis different from the first axis.

7. The apparatus of claim 6 wherein the second axis is substantially orthogonal to the first axis.

8. An optical density determination apparatus comprising:

a densitometer comprising a face plane, the densitometer to emit a light beam to illuminate a spot on a substrate at a first angle relative to a normal vector from a center of the illuminated spot on the substrate and to receive diffused light of the light beam which was reflected by the substrate, the densitometer to provide a signal indicative of an optical density associated with the substrate based on the received diffused light; and a support to tilt the densitometer relative to at least one axis so that the light beam is received at a second angle relative to the normal vector from the center of the illuminated spot, the tilt to reduce a specular reflection of the light beam received by the densitometer relative to when the densitometer is not tilted.

9. The apparatus of claim 8 wherein the densitometer is a first densitometer to emit the light beam comprising a first light beam within a first optical plane, and further comprising a second densitometer to emit a second light beam to illuminate the spot on the substrate within a second optical plane which is substantially orthogonal to the first optical plane.

10. The apparatus of claim 8 wherein the densitometer comprises a light source to generate the light beam and a sensor to sense the light received by the densitometer, and wherein the support is to tilt the face plane relative to an axis which is substantially parallel to a line including the light source and the sensor to tilt the face plane with respect to the substrate.

11. The apparatus of claim 8 wherein the densitometer comprises a light source to generate the light beam and a sensor to sense the light received by the densitometer, and the support to tilt the face plane relative to an axis which is substantially orthogonal to a line including the light source and the sensor and parallel to the face plane to tilt the face plane with respect to the substrate.

12. The apparatus of claim 8 wherein the substrate comprises a marking agent, and the signal is indicative of the optical density of the substrate including the marking agent.

13. The apparatus of claim 8 wherein the densitometer tilts the face plane with respect to the substrate relative to a second axis different from the at least one axis.

14. The apparatus of claim 13 wherein the second axis is substantially orthogonal to the at least one axis.

15. An optical density determination method comprising:

using a first light source to emit a first light beam in a first direction towards a substrate;

using a second light source to emit a second light beam in a second direction towards the substrate, the second direction being different than the first direction;

using a first sensor to sense diffused light of the first light beam reflected from an illuminated spot on the substrate at a first distance from a center of the illuminated spot on the substrate, the first light source to emit the first light beam at a first angle relative to a normal vector from the center of the illuminated spot on the substrate, the first sensor tilted relative to at least one axis at a second angle relative to the normal vector from the center of the illuminated spot on the substrate to reduce a specular reflection of the first light beam sensed by the first sensor from the substrate relative to the first sensor at the normal vector from the center of the illuminated spot on the substrate and at the first distance from the center of the illuminated spot on the substrate;

sensing diffused light of the second light beam reflected from the illuminated spot on the substrate at a second distance from the center of the illuminated spot on the substrate at a third angle relative to the normal vector from the center of the illuminated spot on the substrate to reduce a specular reflection of the second light beam sensed at the third angle relative to the second sensor located at the normal vector from the center of the illuminated spot on the substrate and at the second distance from the center of the illuminated spot on the substrate; and using the sensed light of the first and second light beams, determining an optical density associated with the substrate.

16. The method of claim 15 wherein the emitting and the sensing associated with the first light beam comprise emitting and sensing using a first densitometer, and the emitting and the sensing associated with the second light beam comprise emitting and sensing using a second densitometer.

17. The method of claim 16 wherein the first densitometer is tilted relative to an axis which is substantially parallel to a line including the first light source and the first sensor.

18. The apparatus of claim 16 wherein the first densitometer is tilted with respect to the substrate relative to a second axis different from the at least one axis.

19. The apparatus of claim 18 wherein the second axis is substantially orthogonal to the at least one axis.

20. The method of claim 15 wherein a face plane is tilted relative to an axis which is substantially orthogonal to a line including the first light source and the first sensor, and which is parallel to the face plane.

* * * * *

UNITED STATES PATENT AND TRADEMARK OFFICE

CERTIFICATE OF CORRECTION

PATENT NO. : 8,325,344 B2
APPLICATION NO. : 12/642562
DATED : December 4, 2012
INVENTOR(S) : Michael H. Lee et al.

It is certified that error appears in the above-identified patent and that said Letters Patent is hereby corrected as shown below:

In column 10, line 30, in Claim 18, delete “apparatus” and insert -- method --, therefor.

In column 10, line 33, in Claim 19, delete “apparatus” and insert -- method --, therefor.

Signed and Sealed this
Twelfth Day of March, 2013

Teresa Stanek Rea
*Acting Director of the United States Patent and Trademark Office*